United States Patent [19]
Parr et al.

[11] Patent Number: 5,711,643
[45] Date of Patent: Jan. 27, 1998

[54] PORTABLE SEMI-AUTOMATIC COMPUTER CODE KEY CUTTING MACHINE

[75] Inventors: William Gordon Parr; James H. Brooks, both of Abbotsford, Canada

[73] Assignee: Intralock Tools Ltd., Abbotsford, Canada

[21] Appl. No.: 677,818

[22] Filed: Jul. 9, 1996

[30] Foreign Application Priority Data

Jun. 28, 1996 [CA] Canada ................... 2180231

[51] Int. Cl.$^6$ ................... B23C 3/00; B23C 1/20
[52] U.S. Cl. ................... 409/83; 76/110; 364/474.03; 364/474.25; 409/80
[58] Field of Search ................... 364/474.03, 474.25; 76/110; 409/80, 81, 82, 83

[56] References Cited

U.S. PATENT DOCUMENTS

| | | | |
|---|---|---|---|
| 4,051,748 | 10/1977 | Sherman | 409/81 |
| 4,143,582 | 3/1979 | Heimann | 409/83 |
| 4,281,379 | 7/1981 | Austin | 364/102 |
| 4,551,046 | 11/1985 | Kinas | 409/82 |
| 4,656,590 | 4/1987 | Ace | 364/474.25 |
| 4,741,652 | 5/1988 | Marchal | 409/83 |
| 5,128,531 | 7/1992 | Fadel | 409/83 |
| 5,244,321 | 9/1993 | Sopko | 409/82 |
| 5,259,708 | 11/1993 | Brice | 409/81 |
| 5,365,812 | 11/1994 | Harnden | 364/474.25 |
| 5,441,369 | 8/1995 | Foscan et al. | 409/81 |
| 5,485,399 | 1/1996 | Saigo et al. | 364/525 |

FOREIGN PATENT DOCUMENTS

| | | |
|---|---|---|
| 986348 | 3/1976 | Canada ................... 409/81 |
| 133091 | 2/1985 | European Pat. Off. . |
| 2300656 | 10/1976 | France . |
| 673612 | 3/1990 | Switzerland . |
| 2040759 | 9/1980 | United Kingdom . |
| 2150475 | 7/1985 | United Kingdom . |
| 1450968 | 1/1989 | United Kingdom . |

*Primary Examiner*—Daniel W. Howell
*Assistant Examiner*—Christopher Kirkman
*Attorney, Agent, or Firm*—Klarquist Sparkman Campbell Leigh & Whinston, LLP

[57] ABSTRACT

This invention relates to a programmable semiautomatic portable key cutting machine. More particularly, this invention pertains to a portable key cutting machine which semi-automatically cuts key blanks in accordance with key blank manufacturers' key profile information which is stored in a programmable memory. We have invented a portable semi-automatic computer code key machine with a built-in user definable master key system. The system can be used in the field and operated on 12 volts or 110 volts to create without key patterns or duplicate keys simulated key manufacturers' originals which are programmed in a computer which is part of the machine. A built-in data base of all known manufacturers, spaces and depths. In addition, the user of the machine can add new key specifications as they become available from the manufacturer.

10 Claims, 5 Drawing Sheets

PORTABLE SEMI-AUTOMATIC COMPUTER CODE KEY CUTTING MACHINE

FIELD OF THE INVENTION

This invention relates to a programmable semi-automatic portable key cutting machine. More particularly, this invention pertains to a portable key cutting machine which semi-automatically cuts key blanks according to master key blank manufacturer and key profile information stored in a programmable memory.

BACKGROUND OF THE INVENTION

In lock and key manufacturing facilities, keys are cut using large industrial milling machines with set key patterns operated by high capacity computers. None of these key manufacturing machines are sufficiently light in weight and inexpensive that they are mobile and portable. None are programmable in the field. Master key systems can only be created on a separate computer system in existing systems and downloaded in a key manufacturing environment.

A number of patents disclose various apparatus and machines for custom cutting keys. These are listed and discussed below.

Hueckingha et al., British Patent No. 2040759, Sep. 3, 1980, disclose a key copying machine which has a frame supporting a bearing block. The bearing block supports a shaft with a large diameter cutter at one end with its other end driven through a gear box from a motor. The block also supports a second shaft at right angles to the first shaft but underneath it. This second shaft drives a small cutter. The master key and the key blank are mounted on a swinging clamp so that as the master key is pressed against the peg the cutter cuts radial slots in the blank. When pressed against a peg, the cutter cuts the longitudinal slots.

French Patent No. 2300656, Oct. 15, 1976, assigned to HK France, discloses an automatic key cutting machine which includes a sensor which is contacted by the template key and provides the electrical signals to control the motion of a carriage and tube. The template and the workpiece are mounted on the carriage, a fixed rotary grinder effects workpiece cutting, and separate electric motors are used to drive the carriage, table and grinder. Preferably, the machine includes a rigid blade sensor which is mounted free to oscillate on a vertically displaceable support with an electromagnet effecting upward support displacement, and microcontacts which are actuated by blade oscillation and support displacement resp. The machine is also equipped to effect reciprocal pivoting motions of the workpiece.

Brice, U.S. Pat. No. 5,259,708, Nov. 9, 1993, discloses a machine comprising a carriage including a clamp for securing a blank key and a master key on the carriage, a support shaft supporting the carriage for pivotal movement between a first, operative key cutting position and a second, inoperative position. A manually engageable handle on the carriage provides movement, a fixed tracer contacting the master key when the carriage is in the operative position, with a spring between the shaft and the carriage for urging relative rotation between.

A cutter contacts and cuts the blank key when the carriage is in the operative position, a latch having one state for a manual mode of operation in which the carriage and the shaft are locked for common rotation. In a second state, for an automatic mode of operation, the shaft is locked and the carriage is unlocked from the shaft and is pivoted on the shaft by the spring to the operative position. A drive axially displaces the shaft and the carriage in the operative position in the automatic mode of operation.

Zulliger, Swiss Patent No. 673612, Mar. 30, 1990, discloses a key cutting machine allowing automatic key copying, with central processor receiving data obtained from original key to control orthogonal stepping motors. The machine has a sliding carriage supporting a rotary spindle with a tool chuck at its free end for the cutting tool displaced along a perpendicular axis to the carriage. The key block is supported in a clamp which can be displaced along a further orthogonal axis. The carriage supports a sensor cooperating with the key to be copied, to supply data to a central control processor controlling the stepping motors for all three coordinate directions. The control processor is coupled to input and output terminals and via an interface cable to the mechanical machine control.

In SU 1450968, Jan. 15, 1989, Bershtein, an increased number of variants of cross grooves combination in keys is ensured with the individual cam drive for each sector cam pitching with the coaxial reducer. The last stage of the latter has a transmission with a gear exhibiting an incomplete set of teeth and fitted with a single turn detent, while the output member of each drive is fastened on one shaft with a corresponding sector cam. The drive members in the transmission of the incomplete teeth gear and the fixing discs are tied to the intermediate shafts which carry cams to interact with transducers sensing the end of the turn pitch while being electrically connected to the motors of the individual drives.

The set of keys is clamped by the vice of the table, and the depression of the switch button turns on the drive of the table. The table with the blanks moves with respect to the milling cutters to cut the key grooves, and at the end of the cycle the table presses the transducer which turns on the counter shifting the programme carrier by a frame. The readout follows with the switching of one or several motors controlling the sectors. The programmer determines the depth of the cut grooves in keys and switches each cam drive with signals transmitted by the counter.

Wu, British Patent No. 2150475, Jul. 3, 1985, discloses an automatic key cutting machine which has one motor driving milling cutter, and a second motor driving key carriage left and right dependent upon micro-switch settings. The machine has a pivotally-mounted key carriage that is urged by a torsion spring into a working position in which a key sample and key blank carried by the carriage are respectively engaged with a fixed guide and with a milling cutter. Bi-directional linear movement of the carriage is achieved by attaching the latter to an output member of rotary-to-linear motion converter. The latter is kinematically connected to a reversible motor. Limitation of the movement range of the key carriage is effected by a pair of limit switches that are connected into the energisation circuit of the reversible motor and are controlled by a member moving in synchronisation with the carriage. Completely automatic operation is provided increasing its efficiency.

Specifically, Wu discloses an automatic key cutting machine comprising a motor for rotatably driving a milling cutter; a key carriage for holding a key sample to be copied and a key blank to be machined into the form of the sample by the milling cutter; a guide structure along which the key carriage is linearly movable; bias means for biasing the key carriage into a working position in which a key sample carried thereby is engaged by a guide secured on a frame of the machine, and in which a key blank carried by the carriage is engaged by said milling cutter; a reversible rotary motor; rotary-to-linear motion conversion means arranged to convert rotation of an output shaft of the reversible motor into linear movement, the key carriage being coupled to said conversion means such that operation of the reversible motor causes the key carriage to move along the guide structure in a direction dependent on the sense of rotation of said output shaft; and a limit arrangement for automatically de-energising said reversible motor to stop the key carriage when the cutting of a key blank is complete, said limit arrangement including a pair of spaced switches connected into the energisation circuit of the reversible motor, and a switch-operating member linearly reciprocally movable by said conversion means between said switches whereby to operate the latter at respective predetermined limit positions of the carriage along its guide structure, the rotary-to-linear motion conversion means comprising respective rotary-to-linear motion conversion arrangements for driving the key carriage and for driving the switch-operating member.

In European Patent No. 133091, Feb. 13, 1985, Kinas, key cutting using a universal milling machine is carried out automatically using key images stored in memory. Different notches or teeth images, to be reproduced in the key, are memorized. The images are superimposed in a number corresponding to the number of notches or teeth to be formed in a key blank. The image of the resulting key is then memorized. Relative displacement of the milling tool and of the vice holding the blank are controlled to produce the image contour in a continuous traverse of the blank. The machine uses key outline plate, a cutter and two motors. Two electronic memories contain previous and current images, respectively, with a motor controller assuring a continuous sweep of the plate. Keys can be cut automatically, given the number or code of key, without changing the cutter.

SUMMARY OF THE INVENTION

We have invented a portable semi-automatic computer code key cutting machine with a built-in user definable programmable master key system. The system can be used in the field and operated on 12 DC volts or 110 AC volts to create cut key patterns or duplicate keys which simulate key manufacturers' originals without requiring originals or duplicates. The key patterns are programmed in a computer which comprises part of the key cutting machine. A built-in data base of all known manufacturers, spaces and depths is held in a computer in the machine. In addition, the user of the machine can program new key specifications into the machine as they become available from the manufacturer.

In a specific embodiment, the invention is directed to a programmable semi-automatic portable key cutting machine comprising: (a) a cutting machine for cutting a key pattern in a key blank; (b) a power means for driving the cutting machine; (c) a vice member for holding a key blank for cutting of a key pattern in the key blank by the cutting machine; (d) a movement member for moving the vice member and a key blank held by the vice member reciprocally in lateral and longitudinal directions relative to the cutting machine; (e) a manual member for manually adjusting the lateral position of the movement member; (f) a step motor associated with the movement member for reciprocally moving the movement member in a longitudinal direction; (g) a programmable computer for digitally recording a plurality of key patterns; (h) a first sensor for detecting the lateral position of the movement member, and transmitting the position to the computer means; and (i) second sensor for detecting the longitudinal position of the movement member, and transmitting the position to the computer means.

The manual member can be a hand crank. The computer can control the step motor and the longitudinal position of the movement member.

In the key cutting machine as described, the computer means can have a display and a keyboard for enabling key profile data to be called up from key profile data programmed in the computer means. The power means driving the cutting head can be a DC motor or an AC motor.

In the key cutting machine, the movement member can be a block which reciprocally moves on respective slide shafts which are disposed in lateral and longitudinal orientation relative to the vice member.

The computer can include a port which can receive data from a program or another computer, or a port which can enable the computer to be connected to a printer. The cutting machine can be tilted to cut an angled cut in a key blank.

The key cutting machine can include a shoulder reference arm for aligning a shoulder of a key blank with a zero position of the vice member relative to the cutting machine.

In another specific embodiment, the invention pertains to a method of cutting a profile in a key blank which comprises: (a) programming a plurality of key patterns into a programmable computer means; (b) calling up from the computer means a specific key pattern from the plurality of key patterns; (c) moving a key blank in an incremental manner in a space direction lateral to a key cutting head; and (d) cutting in sequence according to each incremental space step a depth profile in the key blank corresponding to a space and depth profile dictated by the key pattern called up on the computer means.

In the method as described, the computer means can sense the space step position and the depth position of the cutting head by electronic sensors.

BRIEF DESCRIPTION OF THE DRAWINGS

In drawings which illustrate specific embodiments of the invention, but which should not be construed as restricting the spirit or scope of the invention in any way.

DETAILED DESCRIPTION OF THE PREFERRED EMBODIMENT

Figure 1:
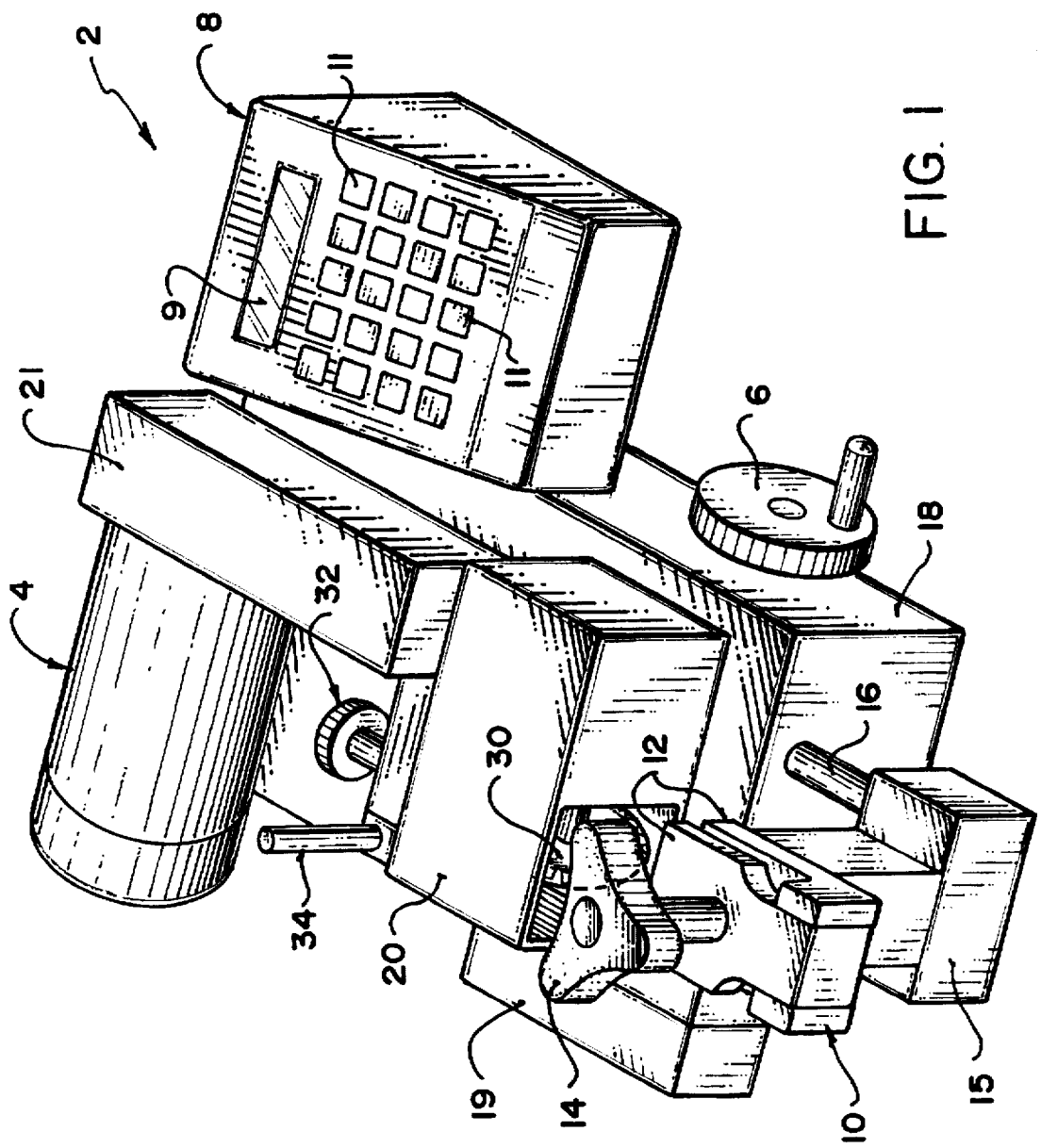
FIG. 1 illustrates a frontal isometric view of the portable semi-automatic computer code key cutting machine.

FIG. 1 illustrates a frontal isometric view of the portable semi-automatic computer code key cutting machine 2. As seen in FIG. 1, the portable semi-automatic computer code key cutting machine 2 is constructed of a cutting head drive motor 4, which is connected by a pulley wheel and belt system (not shown), or some other suitable connection system, to a key cutting head 29 (not shown). The pulley wheel and belt combination are located under housing 21 while the key cutter wheel and drive mechanism are located under housing 20. These components will be discussed in greater detail later in association with FIG. 2.

A programmable key code board 8 is attached to one side of the portable semi-automatic computer code key cutting machine 2. The key code board 8 has a liquid crystal or digital display panel 9 and an array of numbered and lettered keys 11 on the top surface thereof.

A key vice 10, which is adapted to securely hold a key blank (not shown, but see FIGS. 2 and 4), is held in vice jaws 12, which are manually tightened by a vice tightening knob 14. The base of the key vice 10 is mounted on key vice block 15 which is secured to respective ends of a pair of depth control block slide shafts 16 (only one of which is visible in FIG. 1). Key vice 10 and block 15 are movable reciprocally towards or away from slide block housing 18 and cutter wheel 30 by the pair of shafts 16, which slide into or out of housing 18. This reciprocal movement corresponds with the depth of cut to be made on the key blank (not shown) and is controlled by a step motor (not shown). In this discussion, the longitudinal movement of the key vice 10 and block 15 will be known as "depth".

The lateral position of the cutter wheel 30 is also reciprocal and is controlled by hand crank 6. In this discussion, the lateral position will be known as "space". By these movements, longitudinal (depth) and lateral (space), the key vice 10 and blank 22 can be moved in a longitudinal (depth) direction and a lateral (space) direction relative to the cutter wheel 30 to enable the cutting wheel 30 to cut a key profile in the key blank, as prescribed by the appropriate pattern selected from the bank of patterns stored in the computer.

FIG. 1 also shows pull pin 32 and tilt handle 34. Normally, pull pin 32 is in a lock position and holds cutter wheel 30 in a vertical position so it cuts vertical cuts in the key blank. However, if pull pin 32 is pulled or withdrawn, it enables the cutter wheel 30 to be tilted in either direction by tilt handle 34. This permits angle or slanted cuts to be made in the key blank to produce high security keys to fit high security locks, such as those manufactured by Medeco.

Figure 2:
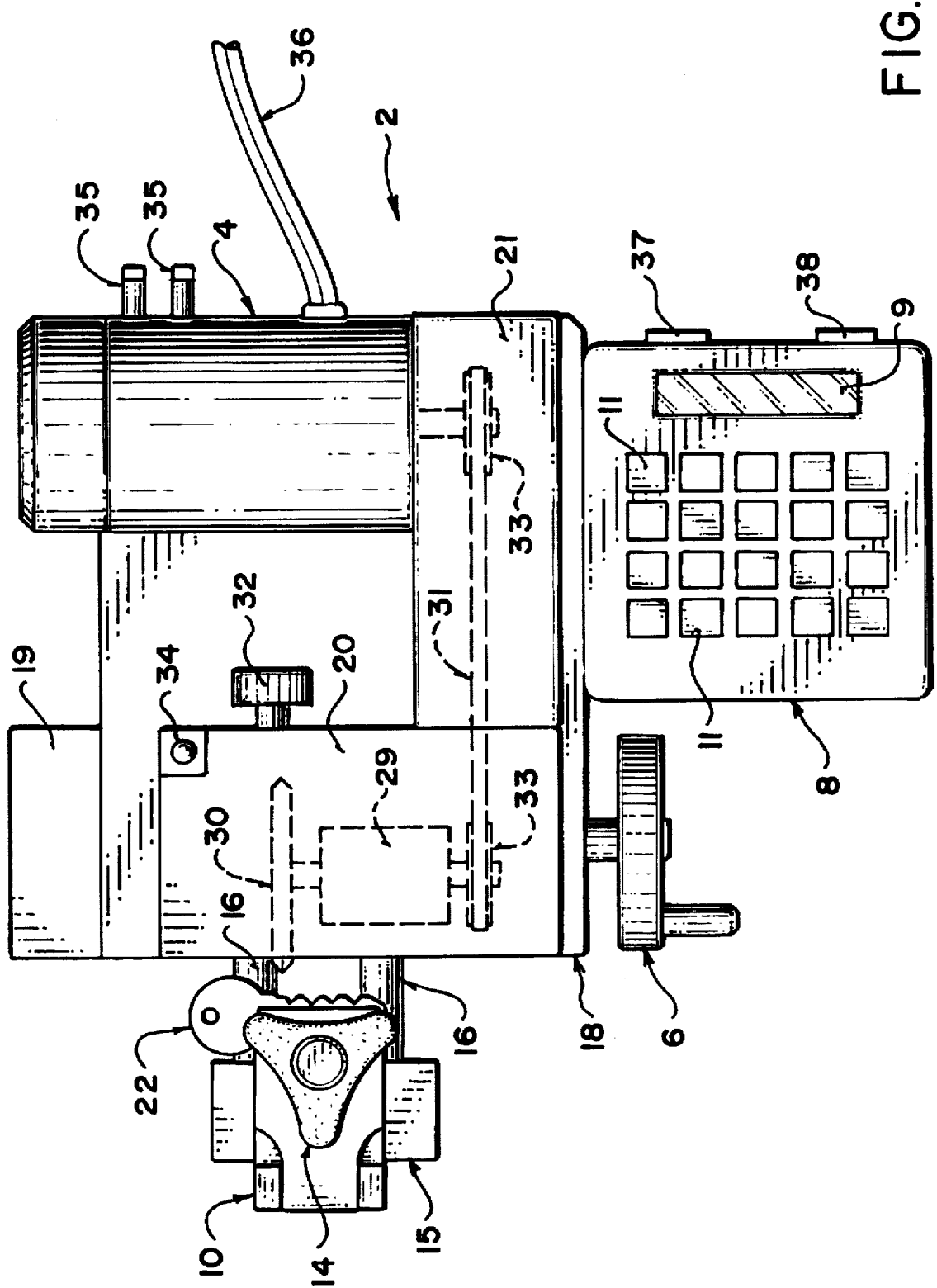
FIG. 2 illustrates a plan view of the portable semi-automatic computer code key cutting machine.

FIG. 2 illustrates a plan view of the portable semi-automatic computer code key cutting machine 2. As seen in FIG. 2 in dotted outline, the cutting head drive motor 4 is rotationally connected by a pair of pulley wheels 33 and an interconnecting belt 31, through a bearing block 29, to key cutting wheel 30. In this way, the motor 4 rotationally drives the cutter wheel 30. While pulley wheels and a belt are shown, any other suitable connection system can be used. The pair of pulley wheels 33, belt 31, bearing block 29 and cutter wheel 30 combination is housed under key cutter housing 20 and cutter belt drive housing 21 (see also FIG. 1). The key cutting wheel 30, which is manufactured by Fraises & Outils Selection SA Vaumarcus, Switzerland, is conventional but can be any one of a number of key cutting wheels that are available on the marketplace.

Hand crank 6 enables the user to manually and reciprocally adjust the lateral (space) position of hand crank slider block 7 (in an up or down direction as seen in FIG. 2), which in turn sets the position of the key vice 10 and vice jaws 12 (not visible), relative to the cutter wheel 30. The space slider block 7 is shown clearly in FIG. 5. The longitudinal position (depth) of the key vice 10 and key blank 22 relative to cutting wheel 30 is determined by the step motor (not shown but see FIG. 4) and the key profile programmed into the computer. The key vice 10 and jaws 12, when tightened by knob 14, hold the key blank 22 to be cut by the key cutting Wheel 30.

Key code board 8 houses a computer and one or more computer chips which have sufficient digital storage capacity to receive and store a large bank of key profile data regarding various keys for lock systems that are manufactured by manufacturers such as Schlage, Master, Medeco, and other well known lock and key manufacturers. With the computer code machine according to the invention, contained in simulated form in a data bank which can be called up by the user, it is not necessary to have a master key, or some other key to be copied or duplicated. The required profile pattern for the specific key to be cut is simulated in a programmed memory. The user need only press the appropriate code buttons 11 on the keyboard of the key code board 8 in order to call up the correct tooth design for the particular key to be cut from a key blank. The key blank, of course, has precut longitudinal grooves (in the space direction) that correspond to the groove pattern of the key made by the specific key and lock manufacturer. A complete array of key profiles for multiple family dwellings (apartments) or office buildings, can be programmed into the computer. The information about key profile, and key catalogue data, is displayed on a liquid crystal display panel 9.

The key code board 8 is adapted so that it enables the user to add additional software data regarding new key profiles and software upgrades that are continually being designed and put on the market by the lock and key manufacturers. This can be done through a conventional RS232 port 38 in the side of the key code board 8. A parallel printer port 37 is also built into the rear side of board 8. Software programmed into the computer enables a printer (not shown) which is connected to the computer in keyboard 8 via port 37 to print out the following reports:

(a) a master key chart or report on a multiple lock and key system, such as an apartment or office building;

(b) a pinning chart or report which provides data on which pins are to be used in specific locks in a single or multiple unit building;

(c) a hardware chart or report detailing the locks and related keys that have been installed in specific locations in the site that is fitted with the network of locks.

As seen in FIG. 2, the drive motor 4 is adapted via positive and negative terminals 35 to be driven by a conventional 12 V DC battery or DC generator (alternator) in an automobile or truck. This is ideal for field or construction site use where the only convenient source of power is an automobile or truck with a 12 V system. The motor 4 can also be driven by a conventional 110 V AC power system via power cord 36.

Figure 3:
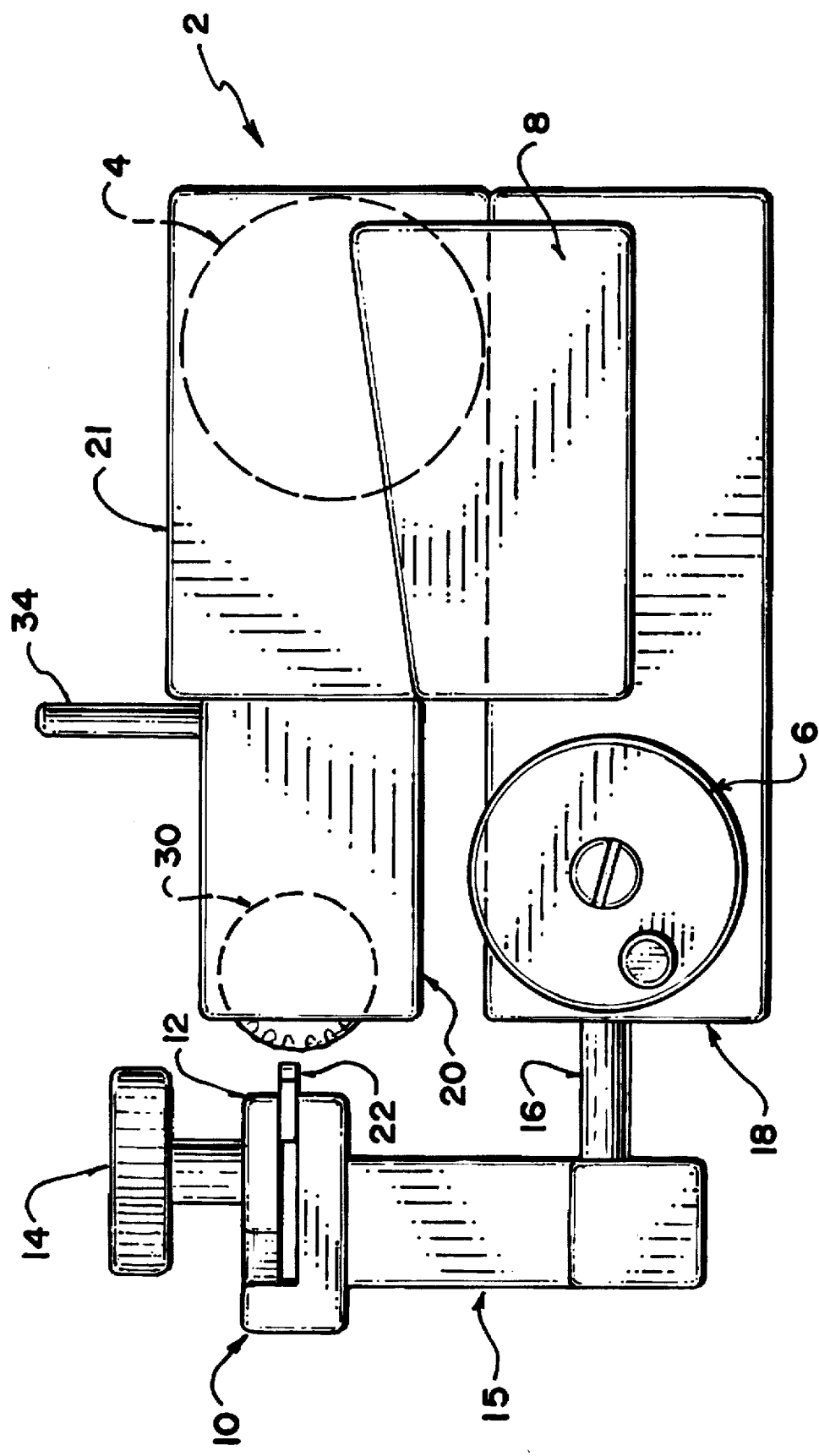
FIG. 3 illustrates a side view of the portable semi-automatic coded computer code key cutting machine.

FIG. 3 illustrates a side view of the portable semi-automatic coded computer code key cutting machine 2. As seen in FIG. 3, the key vice 10, by means of upper and lower vice jaws 12, holds the key blank 22 flat side up and horizontal so that a programmed key profile can be readily cut in the proximate side of the blank 22 by cutting wheel 30 (shown in dotted circular outline). Vice tightening knob 14 enables the user to hand tighten the vice jaws 12 to grip the key blank 22 to thereby hold it securely so it does not move. The key vice 10 and jaws 12 have a recess therein which is shaped to receive a key blank. The key blank is thus always in the correct position. Key vice 10, key vice block 15 and key blank 22 can be advanced towards or away from cutting wheel 30 in a depth direction (left or right as seen in FIG. 3) by stepper motor 28, which will be explained in more detail below in relation to FIG. 4. The hand crank 6 is used to advance or withdraw the key block 15, vice 10, and key blank 22, in a space direction (in a direction into or out of the page as seen in FIG. 3). The position of the hand crank 6 is divided into 400 increments (rather than 360° increments) per rotation to enable a highly accurate space position reading to be made by an optical sensor (not shown in FIG. 3 but see FIG. 4) and the computer housed in the keyboard 8. As mentioned before, the tilt angle of cutter wheel 30 can be tilted off the vertical in either direction by tilt handle 34 to cut angled grooves in the key blank 22.

Figure 4:
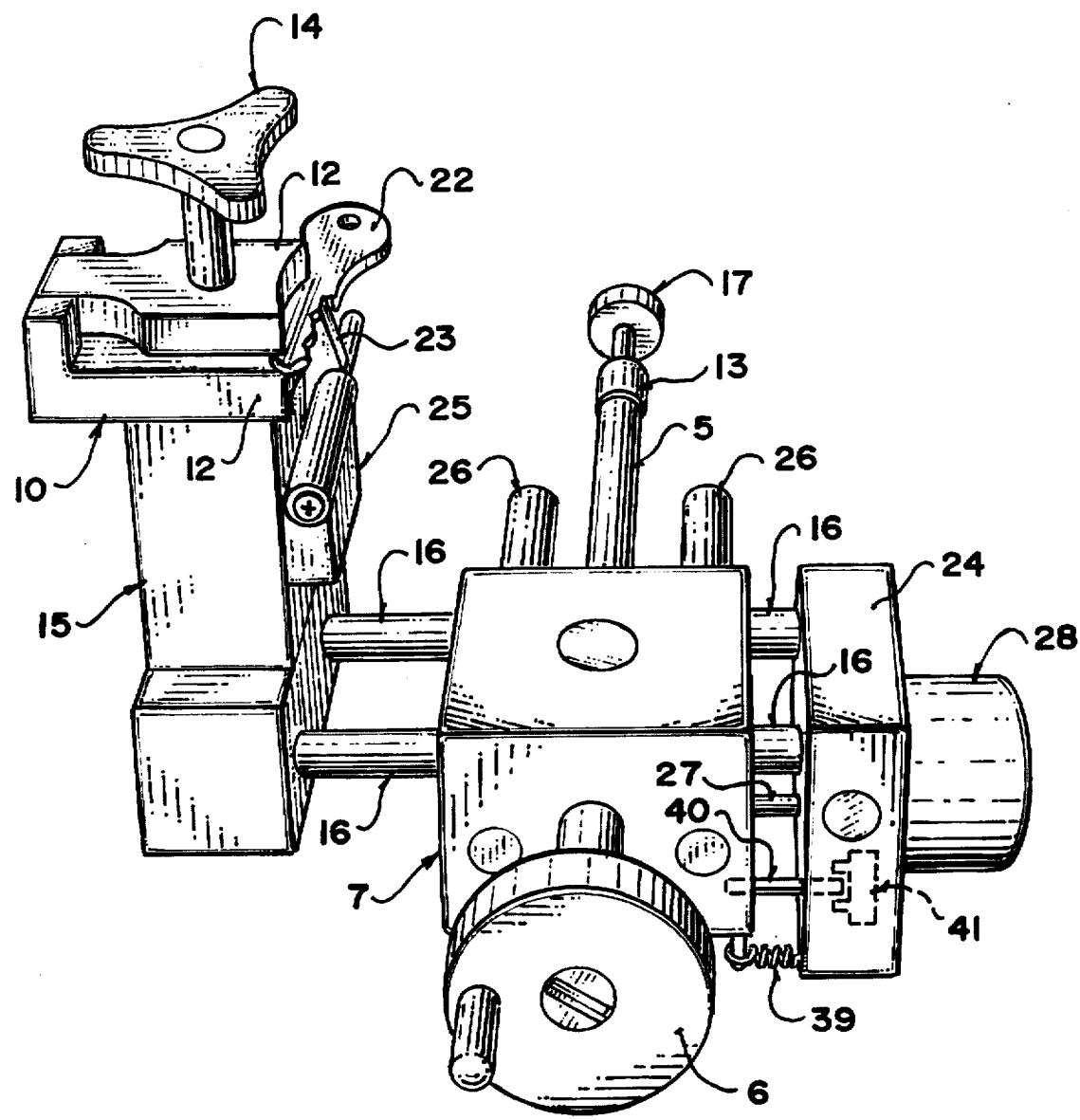
FIG. 4 illustrates a side isometric view of the hand crank, and space slider block, linear step motor, key vice block components of the portable semi-automatic computer code key cutting machine.

FIG. 4 illustrates an isometric view of the major interior and exterior key blank orienting components of the key cutting machine including the hand crank 6, which by square cut Acme threads on space reference rod 5 moves space slider block 7 in a "space" direction. The position of end control block 24 relative to slide block 7 inside main bearing slider housing 18, and in turn, the position of key vice 10, 12, 14 components of the portable semi-automatic computer code key cutting machine 2, is controlled by stepper motor 28. FIG. 4 does not illustrate the cutting wheel 30, keyboard 8 or drive motor 4, and cutter head drive system. However, FIG. 4 illustrates clearly how the linear step motor 28 is connected to end control block 24. Suitable stepper motors are available from many sources but one which we have found suitable for use in the portable semi-automatic computer code key cutting machine 2 is manufactured by Hayden Switch.

The space slider block 7, as seen in FIG. 4, is moved back and forth in a depth direction along a pair of slide block slide shafts 16, by stepper motor 28 which is controlled by the key profile program in the computer. Stepper motor 28, which is connected to end control block 24, moves the slide block 7 on the pair of shafts 16 relative to block 24, in a depth direction, by push rod 27. Block 24 and key vice block 15 are connected by the pair of shafts 16 and the distance between block 24 and vice block 15 is therefore fixed. Thus, when block 24 is pushed away from block 7 by rod 27, the key block 15 advances to the right (as seen in FIG. 4). Alternatively, when the distance between end block 24 and slide block 7 is decreased by the pull created by tension spring 39, the vice block 15 moves away from slide block 7, to the left as seen in FIG. 4. These reciprocal movements in a depth direction enable key blank 22 and key vice 10 to be moved in a depth direction towards or away from the key cutting head 30 (not shown).

The relative space position of the key blank 22 and the slide block 7 on shafts 26 is controlled manually by hand crank 6. Slide block 7 moves in a space direction relative to key blank 22 along the pair of slide shafts 26. The space position of block 7 (and hence key block 15) is determined by a space reference arm 5, coupling 13 and rotary optical sensor 17. A suitable optical sensor 17 can be obtained from Bourne Manufacturing Inc. The space position is being constantly transmitted to and monitored by the computer in the housing 8.

The depth movement and position of block 7 on shafts 16 are controlled in increments by stepper motor 28, block 24 and push rod 27. The "zero" reference depth position of the slide block 7 on shafts 16 relative to the key block 15, key vice 10 and key blank 22 is ascertained by an infrared optical zero position sensor 41 which is mounted on block 24. The zero reference point is determined by the end of reference bar 40 on block 7. The bar 40 breaks a beam of light which passes between two projections on sensor 41. This zero position is also relayed to the computer in key code board 8.

Linear stepper motor 28 is connected directly with end control block 24, and serves to "step" the key block 15, key vice 10 and key blank 22 relative to the slider block 7 depthwise laterally in either direction. In this way, the overall key cutter 30 (not shown), which is stationary relative to the movable key vice 10 and jaws 12 can cut the key blank 22 depthwise in a step manner so that a prescribed depth can be cut in the key blank 22, at the appropriate space position, according to the pattern programmed into the key code board 8, and called up by the user. In other words, the computer, knowing the space position, can tell from the stored key profile, the command that is given to the stepper motor 28 to cut the appropriate depth cut for that specific space position.

The space position of the key blank 22 relative to the cutter head 30 is manually controlled by hand crank 6. The space position of the key blank 22 is sensed by a space position sensor 17 which relays the information to the computer. A conventional key blank 22 has thereon a shoulder which is the point where the depth profile in the key commences. The shoulder of the key blank 22 is determined and referenced by shoulder reference block 25 and shoulder reference flip arm 23. When the user installs the key blank 22 in the key blank recession in the jaws 12, he or she aligns the shoulder of the key blank 22 with the arm 23. The position of the shoulder is then set and is determined by sensor 17 which relays this information to the computer. The computer then "knows" the location of the shoulder of the key blank 22 and that the depth profile can be cut commencing at the shoulder.

The program in the computer is programmed so that the depth and space position of the key blank 22 relative to the cutting head 30 is always known and coordinated. In this way, the appropriate depth of cut in the key relative to a space position along the length of the key blank 22, as selected by the crank 6, and coordinated in depth by the computer, is automatically determined. The depth of cut at the corresponding space position on the key blank 22 thus matches the specific key profile called up from the data bank of key profiles programmed in the computer. In this way, the appropriate profile of sequential depth notches are cut at specific space locations by the cutting head 30 in the facing side of the lock keyhole penetrating portion of the key blank 22.

Figure 5:
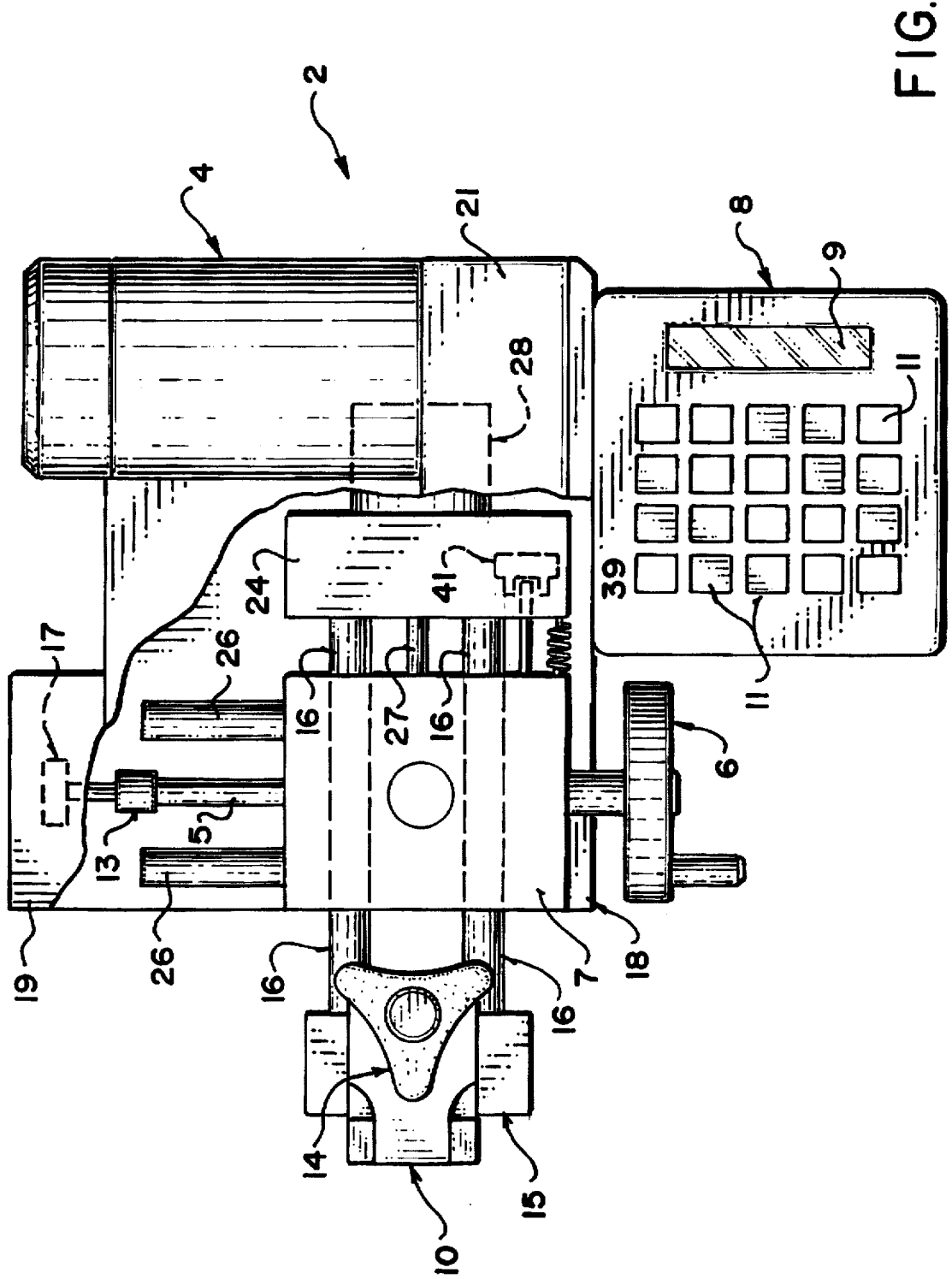
FIG. 5 illustrates a partially cut-away plan view of the portable semi-automatic computer code key cutting machine revealing the space slider block, stepper motor end block and key vice block components of the portable semi-automatic computer code key cutting machine.

FIG. 5 illustrates a partially cut-away plan view of the portable semi-automatic computer code key cutting machine 2 revealing the slider block 7 and the end control block 24 components of the portable semi-automatic computer code key cutting machine 2. FIG. 5 clearly illustrates how the slider block 7 can move via hand crank 6 in a space direction relative to the key vice 10 (which holds the key blank 22) along the pair of block slide shafts 26, and in a depth direction relative to key vice 10 along the pair of slide shafts 16 via step motor 28 (shown in dotted lines). The depth position (right or left) on shafts 16 is powered and controlled by the step motor 28 (dotted lines) which in turn is controlled by the computer from the programmed key profile. The zero depth position of block 7 is determined by sensor 41. A suitable sensor 41 can be obtained from Motorola Corporation. The relative space displacement (in an up or down direction as seen in FIG. 5) of slider block 7 and key vice 10 via shafts 26 is manually adjusted by the user by rotating hand crank 6 clockwise or counterclockwise as the case may be. The space position of block 7 (and vice 10) is determined by sensor 17.

For safety purposes, the computer is programmed so that the drive motor 4 and cutter wheel 30 do not start until the space hand crank 6 is in the first (shoulder) position. The computer is also programmed so that the drive motor 4 and cutter wheel 30 are turned off when the last space position on the key blank removed from the shoulder is reached. The drive motor 4 will not operate in any position outside the distance of the key profile that is to be cut in the key blank.

EXAMPLE

A prototype of the invention constructed by the inventors has demonstrated that a key profile can be cut in 3.5 minutes. The demonstrator called up a key profile from the key profile data bank, aligned the shoulder of the key blank with the space reference arm, and then manually cranked the key blank through successive space positions. The computer activated the step motor for each space position and the cutting head made a depth cut in the key blank which corresponded to the key profile and the appropriate space position. In other words, the computer "knew" from the key profile program called up, the specific depth that was to be cut for each specific space on the key blank. If the operator cranked the hand crank too little or too far, the computer nonetheless commanded the appropriate depth of cut for the specific space the key blank was at.

The prototype portable semi-automatic computer code key cutting machine includes a user definable on-board creatable master key code system. The prototype code key cutting machine can accommodate and be run on 12 volts DC or 110s volt AC during mobile operation. The user interface provided by the keys of the keyboard, and replaceable chips or CD Roms in the keyboard housing, allows instant upgradability as new key profile designs are issued by the lock and key manufacturers. The keyboard interface of the prototype also allows control over flat widths, software space and key depth correction. The prototype code key cutting machine uses state of the art electronics, a bitting translator developed by the inventors and a dynamic motion control system. Self-applied manual mechanical motion imparted on the crank and computer controlled vector synthesis imparted by the computer driven step motor have been combined to create an inexpensive rugged reliable portable field code key cutter.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A programmable semi-automatic portable key cutting machine comprising:
   (a) a cutting machine for cutting a key pattern in a key blank;
   (b) a power means for driving the cutting machine;
   (c) a vice member for holding a key blank for cutting of a key pattern in the key blank by the cutting machine;
   (d) a movement member for moving the vice member and a key blank held by the vice member reciprocally in lateral and longitudinal directions relative to the cutting machine;
   (e) a manual member for manually adjusting the lateral position of the movement member;
   (f) a step motor associated with the movement member for reciprocally moving the movement member in a longitudinal direction;
   (g) a programmable computer for digitally recording a plurality of key patterns;
   (h) a first sensor for detecting the lateral position of the movement member, and transmitting the position to the computer means; and
   (i) second sensor for detecting the longitudinal position of the movement member, and transmitting the position to the computer means.

2. A key cutting machine as claimed in claim 1 wherein the manual member is a hand crank.

3. A key cutting machine as claimed in claim 1 wherein the computer controls the step motor and the longitudinal position of the movement member.

4. A key cutting machine as claimed in claim 1 wherein the computer means has a display and a keyboard for enabling key profile data to be called up from key profile data programmed in the computer means.

5. A key cutting machine as claimed in claim 1 wherein the power means driving the cutting head is a DC motor or an AC motor.

6. A key cutting machine as claimed in claim 1 wherein the movement member is a block which reciprocally moves on respective slide shafts which are disposed in lateral and longitudinal orientation relative to the vice member.

7. A key cutting machine as claimed in claim 1 wherein the computer includes a port which can receive data from a program or another computer.

8. A key cutting machine as claimed in claim 1 wherein the computer includes a port which enables the computer to be connected to a printer.

9. A key cutting machine as claimed in claim 1 wherein the cutting machine can be tilted to cut an angled cut in a key blank.

10. A key cutting machine as claimed in claim 1 including a shoulder reference arm for aligning a shoulder of a key blank with a zero position of the vice member relative to the cutting machine.

* * * * *